(12) United States Patent
Tan et al.

(10) Patent No.: US 12,088,432 B2
(45) Date of Patent: Sep. 10, 2024

(54) MAPPING VIRTUAL LOCAL AREA NETWORK (VLAN) TAGS

(71) Applicant: Arista Networks, Inc., Santa Clara, CA (US)

(72) Inventors: Nicholas Tan, Vancouver (CA); Wade Carpenter, Burnaby (CA); Kartik Chandran, Los Altos, CA (US); Adam James Sweeney, San Jose, CA (US); Chandrashekhar Appanna, Austin, TX (US); Christoph Schwarz, Burnaby (CA); Victor Wen, San Jose, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 151 days.

(21) Appl. No.: 17/516,982

(22) Filed: Nov. 2, 2021

(65) Prior Publication Data

US 2023/0138323 A1 May 4, 2023

(51) Int. Cl.
*H04L 12/46* (2006.01)
(52) U.S. Cl.
CPC ...... *H04L 12/4645* (2013.01); *H04L 12/4633* (2013.01)
(58) Field of Classification Search
CPC ............ H04L 12/4633; H04L 12/4645; H04L 12/4675; H04L 41/08
See application file for complete search history.

(56) References Cited

U.S. PATENT DOCUMENTS

| | | | |
|---|---|---|---|
| 2003/0152075 A1* | 8/2003 | Hawthorne, III | H04L 12/4641 370/428 |
| 2007/0268823 A1 | 11/2007 | Madison et al. | |
| 2010/0142537 A1 | 6/2010 | Lee et al. | |
| 2011/0249970 A1* | 10/2011 | Eddleston | H04L 12/18 398/58 |
| 2014/0043972 A1* | 2/2014 | Li | H04L 47/17 370/392 |
| 2017/0048143 A1 | 2/2017 | Roy et al. | |
| 2017/0109698 A1* | 4/2017 | Panemangalore | G06F 16/3329 |

OTHER PUBLICATIONS

"Bulk Configuration of VLAN Ranges Using Agent-Circuit-Identifier Information Overview—Technical Documentation—Support"; https://www.juniper.net/documentation/en_US/junose15.1/topics/concept/vlan-bulk-configuration-using-agent-circuit-identifier-information-overview.html, 2 pages, Aug. 14, 2014.
Juniper Networks, Inc; "Ethernet Switching and Layer 2 Transparent Mode Feature Guide for Security Devices", 2017.

(Continued)

*Primary Examiner* — Mansour Oveissi
(74) *Attorney, Agent, or Firm* — Fountainhead Law Group, PC

(57) ABSTRACT

A command line interface in a network device provides for specifying Virtual Local Area Network (VLAN) tag manipulations using range mappings to avoid error-prone repetitive configuration. A flexible VLAN tag range mapping is described, where the original and transformed ranges can be specified for both inner and outer positions, as long as the number of tags on either side of the transformation is the same.

16 Claims, 12 Drawing Sheets

(56) References Cited

OTHER PUBLICATIONS

"Configuaration VLAN Mapping"—Confiruration Guides-R612x-6W102;http://www.h3c.com/en/Support/Resource_Center/EN/Home/Switches/00-Public/Configure/Configuration_Guides/H3C_S5130S-SI[LI]_S5120V2-SI[LI]CG-R612x-6W102/, 22 pages; Retrieved from Website 2021.
"Configuring Many-to-Many Bundling—TechLibrary"; https://www.juniper.net/documentation/en_US/junos/topics/task/configuration/layer2-security-qinq-tunneling-srx-series-many-els.html; 4 pages; Apr. 27, 2017.
"H3C S12500X-AF Switch Series Layer 2—LAN Switching Command Reference"; http://www.h3c.com/en/Support/Resource_Center/HK/Switches/H3C_S12500X-AF/H3C_S12500X-AF_Series_Switches/Technical_Documents/Command/Command_Reference/H3C_S12500X-AF_CR(R320x)-6W100/03/; 414 pages, 2019.
"Nautobot Relationships—Network to Code"; https://blog.networktocode.com/post/nautobot-relationships-part-1/; 11 pages; Jul. 15, 2021.

* cited by examiner

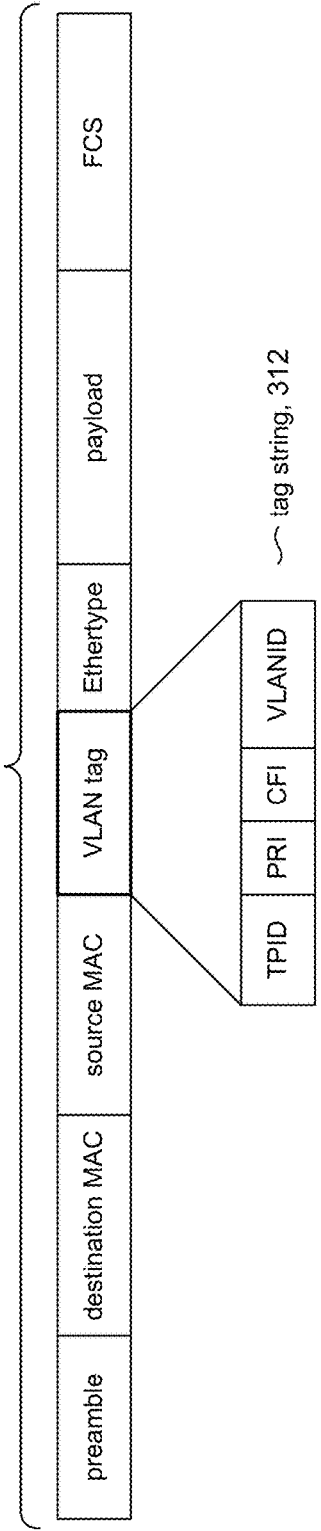

MAPPING VIRTUAL LOCAL AREA NETWORK (VLAN) TAGS

BACKGROUND

Local Area Networks (LANs) define domains within a network device (e.g., switch), independently of other network devices. Virtual LANs (VLANs), however, can span multiple network devices through the use of VLAN tags; for example, as specified by the Institute for Electrical and Electronics Engineers (IEEE) 802.1q and 802.1ad specifications. A packet is tagged (encapsulated) with a VLAN tag in the Ethernet frame by a sending network device to inform which packet belongs to which VLAN in the receiving device.

Configuring and subsequently managing VLANs in a network device includes defining the mappings between incoming VLAN tags to VLANs defined in the network device to produce egress packets for transmission by the network device. In a 802.1q (dot1q) use case, for example, a user (system administrator) may want to map an ingress packet with a VLAN tag of "10" to produce an egress packet having a VLAN tag "20." Similarly, in a double-tagged use case, such as Q-in-Q, 802.1ad (dot1ad), and the like, the user may want to map an ingress packet tagged with an outer/inner pair to an egress packet tagged with a different outer/inner pair.

Configuring the network device with these simple mappings can be easily performed by a user (e.g., network administrator) with a single command line interface (CLI) command. However, in a large deployment, a large number of VLAN tag mappings may need to be configured in the network device. It would not be an unusual use case to require many tens, even hundreds, of such mappings, requiring as many corresponding CLI commands to configure the network device. This can be a time-consuming and error-prone task.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIGS. 3A, 3B, 3C illustrate Ethernet packets described in the present disclosure.

DETAILED DESCRIPTION

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1A:
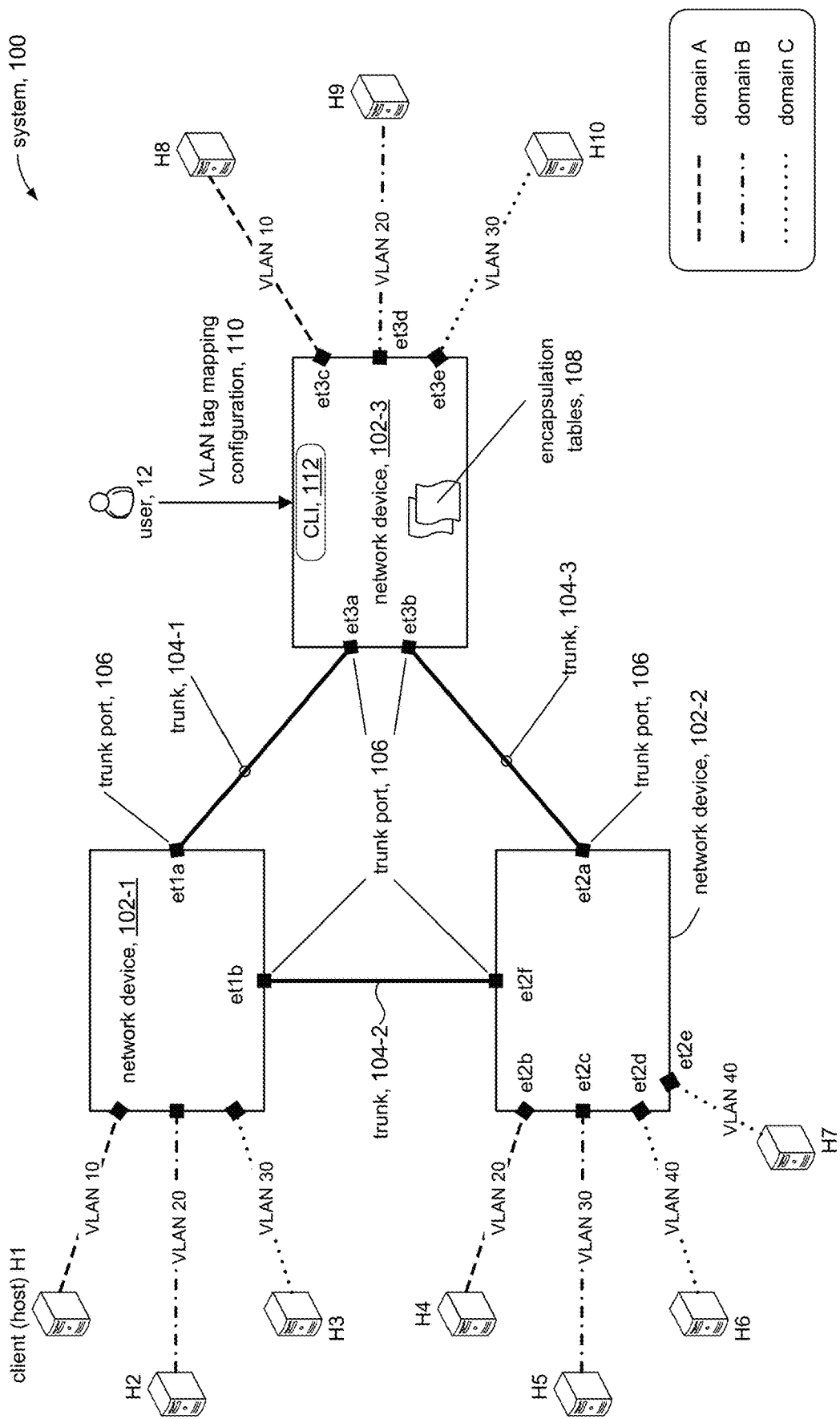
FIGS. 1A and 1B illustrate configurations of network devices in accordance with some embodiments.

FIG. 1A shows a deployment (system 100) of network devices suitable for describing embodiments in accordance with the present disclosure. System 100 can be a local area network (LAN), for example. System 100 comprises network devices 102. Although the network devices in FIG. 1A are depicted as switches, it will be appreciated that in other embodiments, the network devices can be other packet forwarding devices such as routers, layer 3 switches, and the like. Clients (hosts) H1-H10 are connected to respective ports (physical interfaces) on network devices 102. Clients H1, H2, H3, for example, are connected to respective ports on network device 102-1. Likewise, clients H4, H5, H6, H7 are connected to respective ports on network device 102-2, and clients H8, H9, H10 are connected to respective ports on network device 102-3.

A network device can be configured with one or more virtual local area networks (VLANs). Ports on the network device can be associated with multiple VLANs; such ports can be referred to as access ports. A device connected to a (access) port is deemed to be on the VLAN associated with that port. Devices connected to a given VLAN are able to access data from any machine that is also connected to the given VLAN. Referring to network device 102-2 in FIG. 1A, for example, ports et2b, et2c, et2d, et2e are access ports that are respectively associated with VLAN 20, VLAN 30, VLAN 40. Client H4 (connected to port et2c) is associated with VLAN 20, client H5 is connected to VLAN 30, and clients H6, H7 are on VLAN 40. Client H4 cannot access clients H5, H6, H7 because those clients are on a VLAN different from client H4. On the other hand, clients H6, H7 can access each other because they are on the same VLAN.

A VLAN defined in one network device is generally not related to a VLAN defined in another network device. For example, VLAN 30 on network device 102-1 is separate from VLAN 30 on network device 102-2. Nevertheless, VLANs in separate network devices can be logically connected to define a network domain that spans the network devices by way of a mechanism referred to as VLAN tagging. The VLAN tagging mechanism allows for multiple separate network domains to be defined across network devices.

VLAN tagging (encapsulation) is well understood. For example, the IEEE 802.1q standard specifies a format and procedures for VLAN tagging. In addition to standardized VLAN tags, network equipment manufacturers may define their own VLAN tagging formats and procedures. Briefly, when a packet from a client on a VLAN in a given network device is sent to another network device, the packet can be tagged (encapsulated) by the sending network device with an identifier (VLAN ID, VID) that identifies the VLAN associated with the port to which the client is connected. Packet processing logic (e.g., packet processor) in the receiving network device can map the VLAN tag contained in the received packet to one of its local VLANs and forward the packet to the port associated with that local VLAN. The two VLANs (in the sending and receiving network devices) can be said to constitute or define a network domain. FIG. 1A, for example, shows three network domains A, B, C that span network devices 102. Network domain A, for example, comprises VLAN 10 on network device 102-1, VLAN 20 on network device 102-2, and VLAN 10 on network device 102-3. Network domain B comprises VLAN 20 on network device 102-1, VLAN 30 on network device 102-2, and VLAN 20 on network device 102-3. Network domain C comprises VLAN 30 on network device 102-1, VLAN 40 on network device 102-2, and VLAN 30 on network device 102-3.

Network devices 102 can be interconnected by physical connections called trunks 104-1, 104-2, 104-3. Each trunk carries traffic comprising packets that are VLAN tagged. For example, trunk 104-1 can carry packets that are tagged with VLAN 10, VLAN 20, or VLAN 30. The port of a network device that a trunk is connected to can be referred to as a trunk port. In FIG. 1A, for example, network device 102-1 has two trunk ports 106, namely port et1a and port et1b, and likewise ports et2a, et2f are configured as trunk ports on network device 102-2.

A network device in accordance with the present disclosure can include encapsulation tables to translate VLAN tags contained in packets that transit the network device; e.g., packets that flow from a client to the network and packets that flow from the network to a client. Network device 102-3 in FIG. 1A, for example, shows encapsulation tables 108 which can be stored in a suitable data store (not shown) of the network device. In some embodiments, each port in a network device that is configured as a trunk port can be associated with its corresponding encapsulation table. In network device 102-3, for example, each trunk port et3a and et3b can be associated with a respective encapsulation table.

User 12 (e.g., network administrator) can input VLAN tag mapping configuration 110 to generate VLAN tag translation entries in encapsulation table 108, for example via command line interface (CLI) 112. In accordance with the present disclosure, VLAN tag mapping configuration 110 can express the translations (mappings) in terms of ranges. It will become appreciated that the use of ranges can replace hundreds of manual translation entries that user 12 might otherwise be required to input in a large deployment. Although not shown, in some embodiments, network devices can include a machine interface so that automation, such as a central controller, can input VLAN mapping tag translation entries into encapsulation table 108.

Figure 1B:
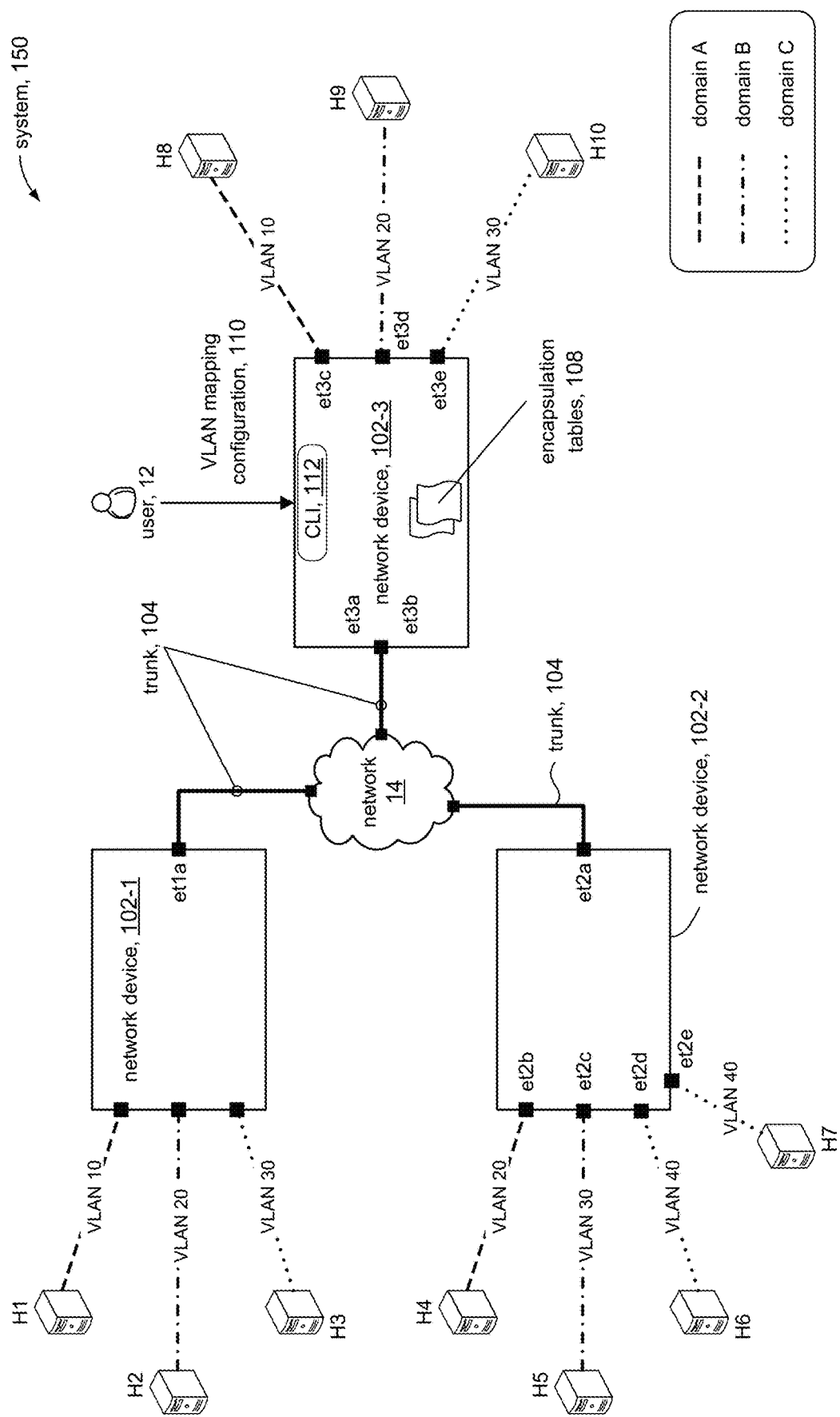

FIG. 1B shows a deployment (system 150) of network devices 102 in accordance with another embodiment. System 150 can be used as a wide area network (WAN), for example. The trunked connections are made to communication network 14 (e.g., a wide area network, public switched network, etc.), rather than to each other. Network domains A, B, C extend across communication network 14.

Figure 2:
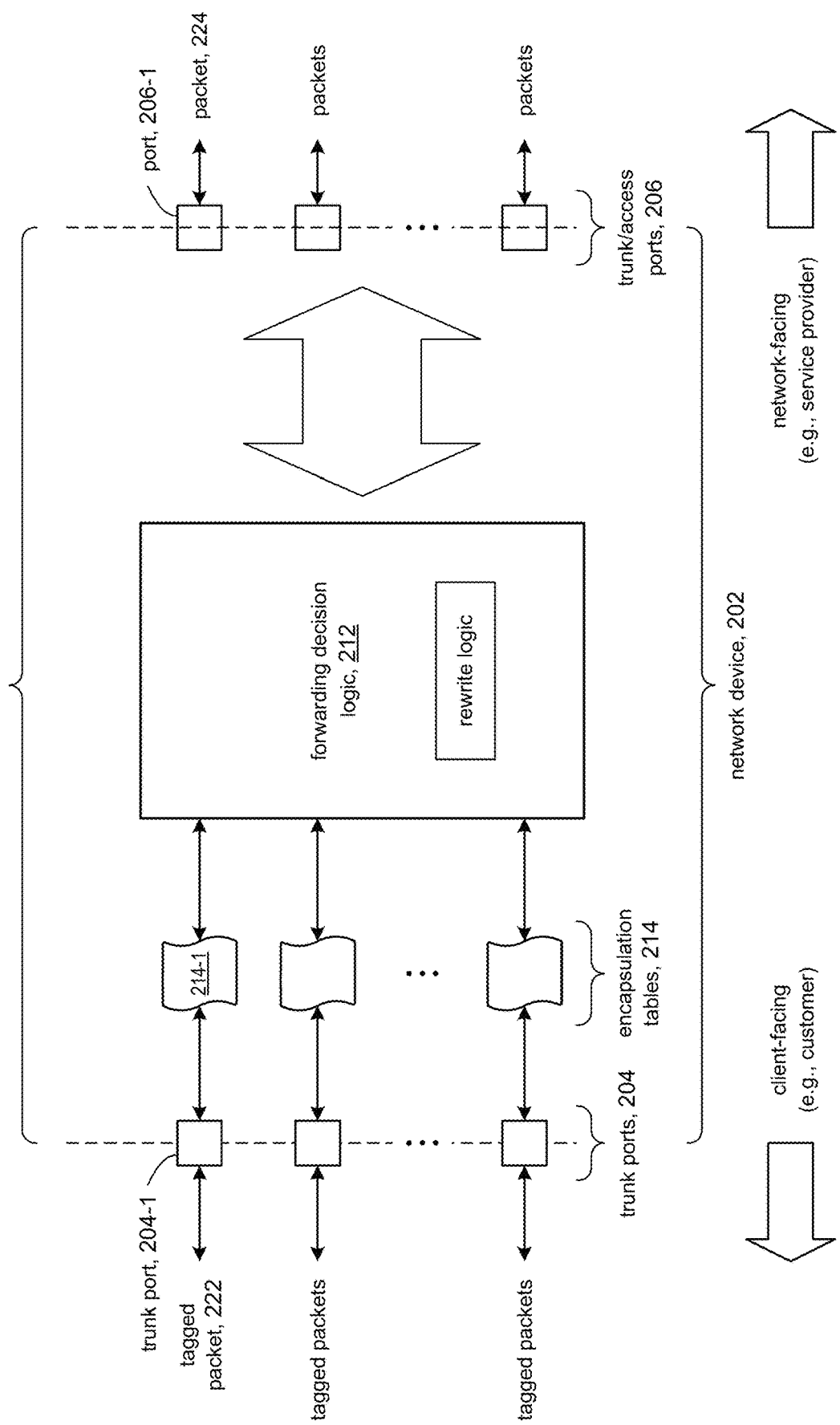
FIG. 2 shows a network device in accordance with some embodiments.

FIG. 2 shows additional details in a network device 202 to illustrate VLAN tag mapping or translation in accordance with some embodiments. Network device 202 comprises ports (e.g., physical interfaces). For discussion purposes, ports 204, 206 of network device 202 are shown; ports 204 are shown configured as trunk ports and each of ports 206 can be configured as an access port (connected to a client) or a trunk port (connected to a network device). Forwarding decision logic 212 represents circuitry that processes ingress packets for egress; e.g., packet processor(s) forwarding tables, etc.

In accordance with the present disclosure, trunk ports are associated with an encapsulation table. FIG. 2, for example, shows encapsulation tables 214 associated with respective trunk ports 204.

VLAN tag translation will be described first with respect to tagged packet 222 ingressing on trunk port 204-1. Packet 222 represents a packet received from a downstream client. A VLAN tag in packet 222 that matches an entry in the encapsulation table 214-1 associated with port 204-1 can be rewritten (mapped, translated) to a different VLAN tag prior to being processed by forwarding decision logic 212 for transmission (egress) on one of the ports 206. More specifically, the original VLAN tag is replaced with a translated VLAN tag. If a VLAN tag does not have an entry in the encapsulation table, packet 222 can be passed to forwarding decision logic 212 without replacing the original VLAN tag. The forwarding decision logic can process the packet accordingly to transmit the translated packet. In some embodiments, the rewrite logic can be included in forwarding decision logic 212.

Conversely, consider packet 224 ingressing on port 206-1. Packet 224 can represent a packet received from the network and is forwarded by forwarding decision logic 212. Suppose the forwarding decision logic forwards packet 224 to port 204-1 for transmission on the port. Prior to transmission, the rewrite logic can use the encapsulation table 214-1 to translate or otherwise rewrite the VLAN tag in packet 224. The translated packet is then transmitted (egresses) on port 204-1.

FIGS. 3A, 3B, 3C illustrate examples of VLAN tagging in the context of an Ethernet packet. First, FIG. 3A shows the general format for an untagged Ethernet packet (frame) 300. For example, FIG. 3A represents the format for packets that can be exchanged between a network device (e.g., 102-1) and a client (e.g., H1) connected to the network device.

FIG. 3B shows the general format for a tagged Ethernet packet 302, for example, tagged according to IEEE 802.1q. Tagged packets can be exchanged between network devices; e.g., between network device 102-1 and network device 102-3. Tagged Ethernet packet 302 includes a VLAN tag comprising various bit fields including a Tag Protocol Identifier (TPID) and a VLAN Identifier (VLANID), a 3-bit Priority (PRI), and a Canonical Format Indicator (CFI). TPID identifies the type of VLAN tagging. For example, a TPID of 0x8100 indicates 802.1q tagging, while a TPID of 0x88A8 indicates VLAN tagging in accordance with IEEE 802.1ad, and so on. The TPID can be vendor-specific to specify vendor-specific tagging. VLANID identifies the VLAN on which the packet was sent. PRI indicates class of service (COS). Tag string 312 refers to the sequence of bits that comprise the VLAN tag, and in some contexts may refer to certain bit fields of the VLAN tag.

FIG. 3C shows a double-tagged Ethernet packet 304. Double tagging is also referred to as dot1ad, Q-in-Q, VLAN stacking, and so on, and indicates the specific process (e.g., tag format, tag contents) by which the tagging is performed. In double-tagging, a packet is initially tagged with an "inner" VLAN tag and then tagged again with an "outer" VLAN tag. Double tagging can be used, for example, by a service provider that provides Internet access to customers who transport their own VLAN tagged traffic across the service provider's network. The customer's VLAN tag appears in the packet as the inner VLAN tag. The service provider may have their own set of VLAN tags, for example, one tag for each customer, in order to carry their customers' traffic on their trunk lines. The service provider's tag would appear in the packet as the outer VLAN tag. Tag string 314 refers to the sequence of bits that comprise the outer and inner VLAN tags and in some contexts may refer to certain bit fields comprising the outer and inner VLAN tags.

Figure 4A:
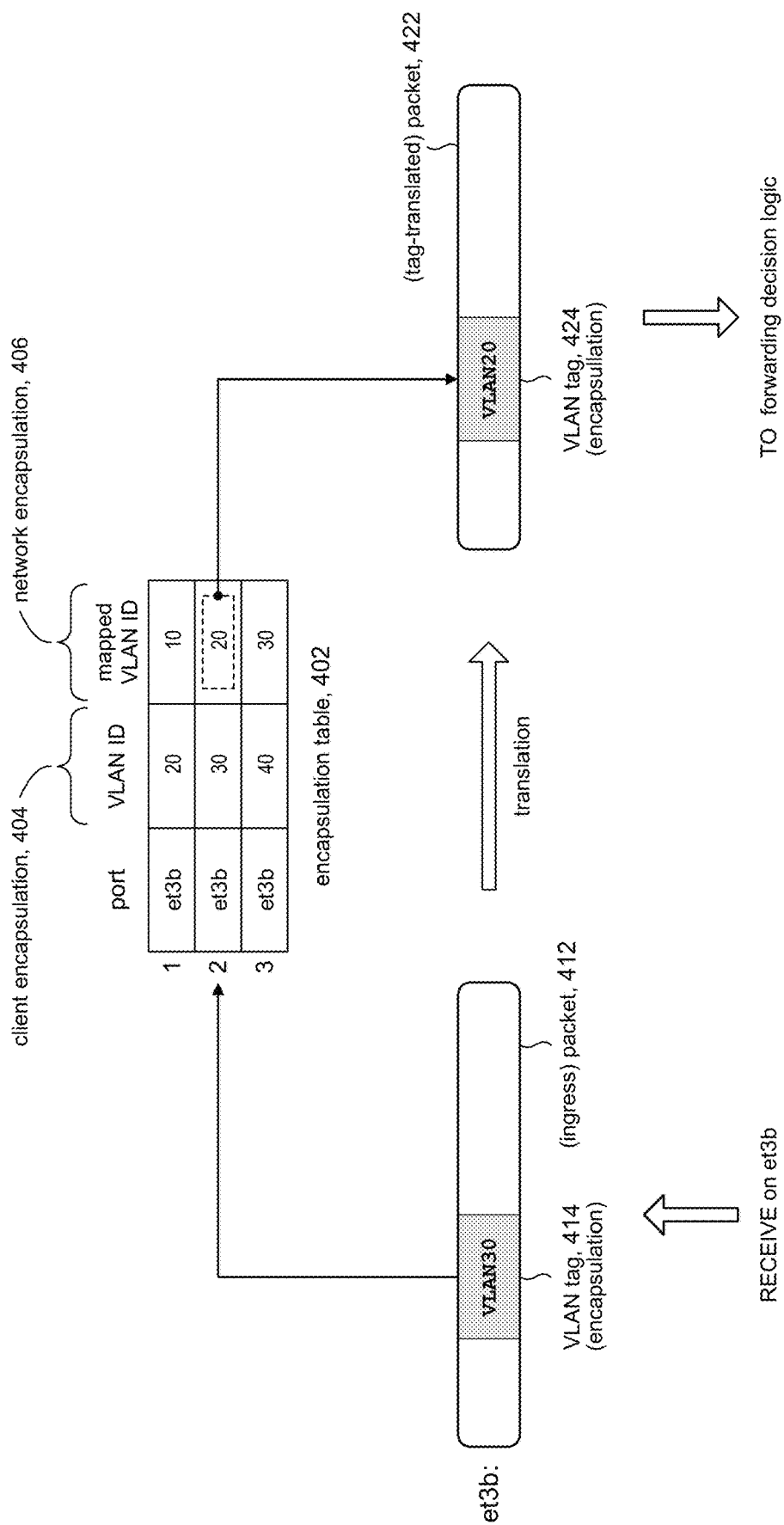
FIGS. 4A and 4B illustrate examples of VLAN tag translation.

FIG. 4A shows a simplified illustrative example of an encapsulation table in accordance with some embodiments. As explained above in connection with FIG. 2, each port in a network device is associated with a respective encapsulation table. Encapsulation table 402 shown in FIG. 4A, for example, is associated with port et3b of network device 102-3 (FIG. 1). Although the "port" column is superfluous, it is provided to emphasize that the encapsulation table is associated with a particular port, in this case port et3b. Client encapsulation column 406 refers to VLAN tag encapsulation of packets received from the client-facing side of the network device. Similarly, network encapsulation column 408 refers to VLAN tag encapsulation of packets received from the network-facing side of the network device.

FIG. 4A illustrates the translation of (ingress) packet 412 received on port et3b. VLAN tag 414 represents the encapsulation of packet 412. VLAN tag 414 (specifically the VLAN ID component) matches entry 2 in the encapsulation table. The VLAN ID is mapped according to the matched entry to produce (tag-translated) packet 422 containing translated VLAN tag 424. The tag-translated packet can then proceed to the forwarding decision logic.

Figure 4B:
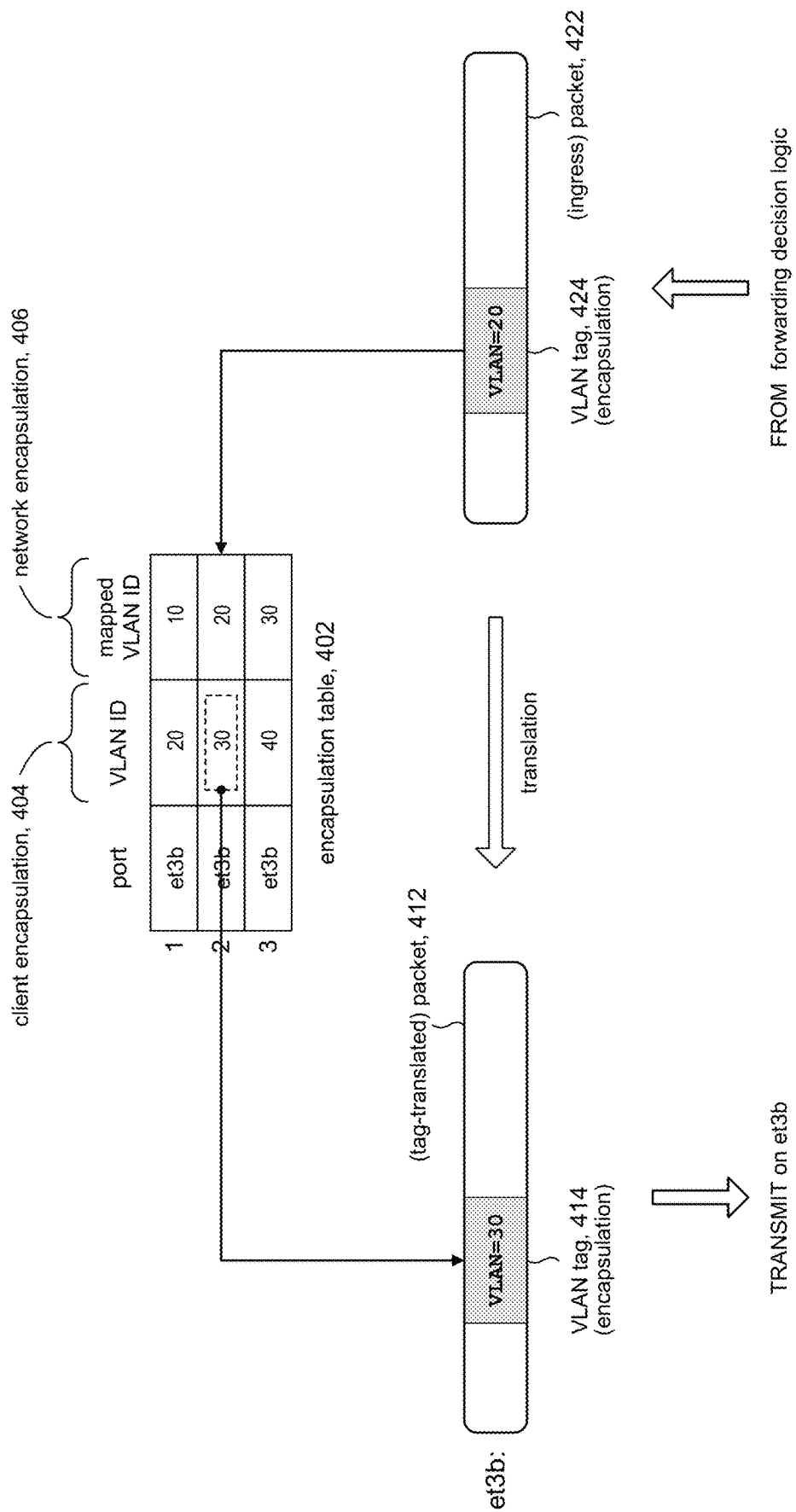

FIG. 4B illustrates the translation of (ingress) packet 422. Assume for discussion purposes that the forwarding decision logic forwards packet 422 to port et3b. VLAN tag 424 represents the encapsulation of packet 422. VLAN tag 424 (specifically the VLAN ID component) matches entry 2 in the encapsulation table associated with port et3b. The VLAN ID is mapped according to the matched entry to produce (tag-translated) packet 412 containing translated VLAN tag 414. The tag-translated packet can then be transmitted on et3b.

It can be seen from FIGS. 2, 4A, and 4B that tag translation is bidirectional in that the encapsulation is applied to upstream packets and to downstream packets. Moreover, tag translation is symmetrical with respect to a given port in that a VLAN ID of 10 from the client side translates to 20 on the network side and, vice versa, a VLAN ID of 20 from the network side translates to 10 on the client side.

Figure 5A:
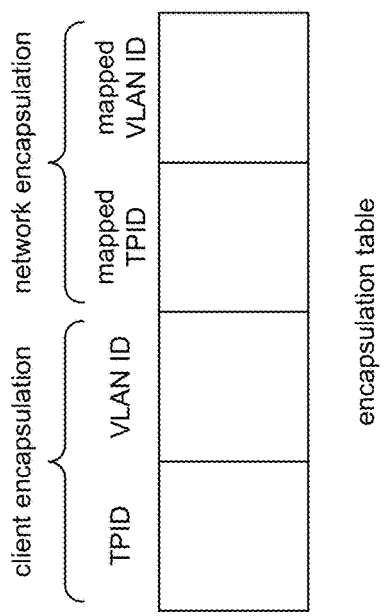
FIGS. 5A, 5B, 5C, 5D illustrate examples of encapsulation tables.

FIGS. 5A-5D illustrate encapsulation tables in accordance with other embodiments of the present disclosure. The encapsulation table shown in FIG. 4 illustrates an example for translating the VLAN ID component in the VLAN tag to another VLAN ID. More generally, however, encapsulation tables can support translations of any one or more components of a VLAN tag. In addition, single-tagged encapsulations can be mapped to double-tagged encapsulations, and vice versa. FIG. 5A, for instance, shows a simplified representation of an encapsulation table to support translation of any one or more components (e.g., TPID, VLAN ID, etc.) in the VLAN tag of the ingress packet to different values prior to the packet being processed by the forwarding decision logic.

Figure 5B:
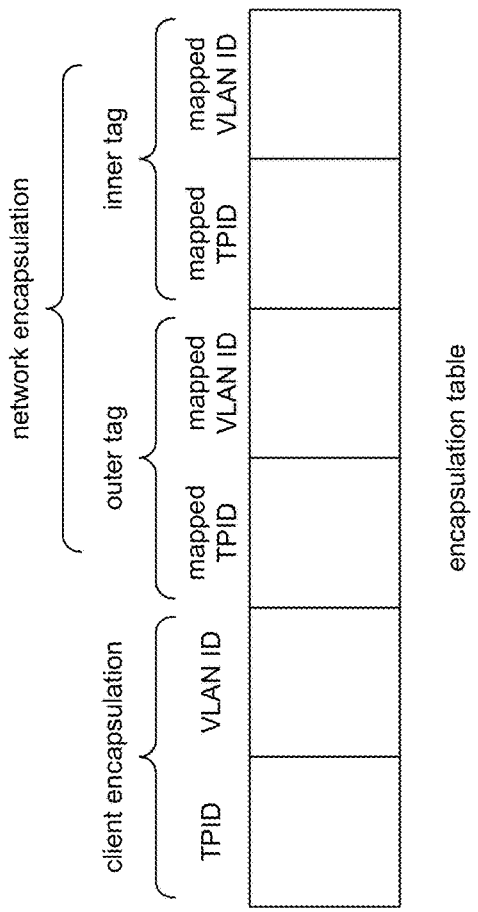

FIG. 5B shows a simplified representation of an encapsulation table to support single-to-double VLAN tag translations. A single-tagged VLAN tag in the ingress packet can be translated to a double-tagged VLAN tag.

Figure 5C:
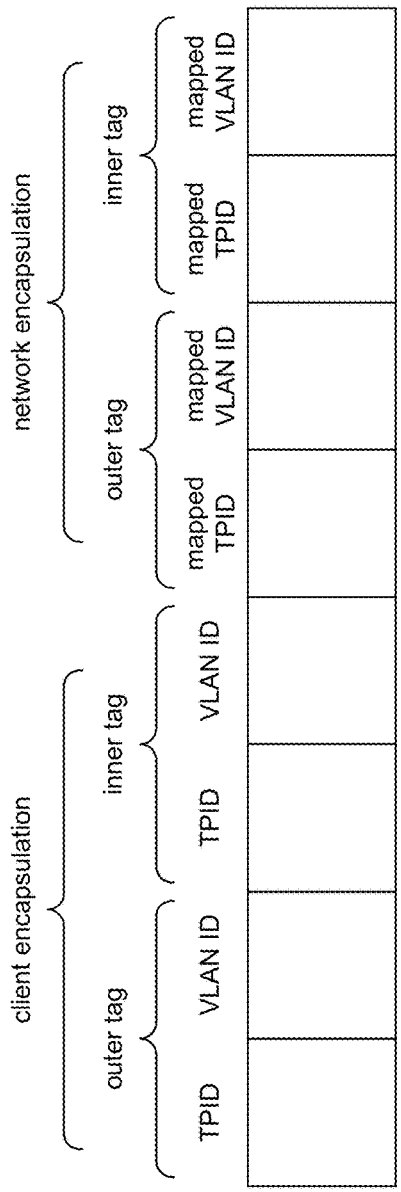

FIG. 5C shows a simplified representation of an encapsulation table to support double-to-double VLAN tag translations. A double-tagged VLAN tag in the ingress packet can be translated to a different double-tagged VLAN tag.

Figure 5D:
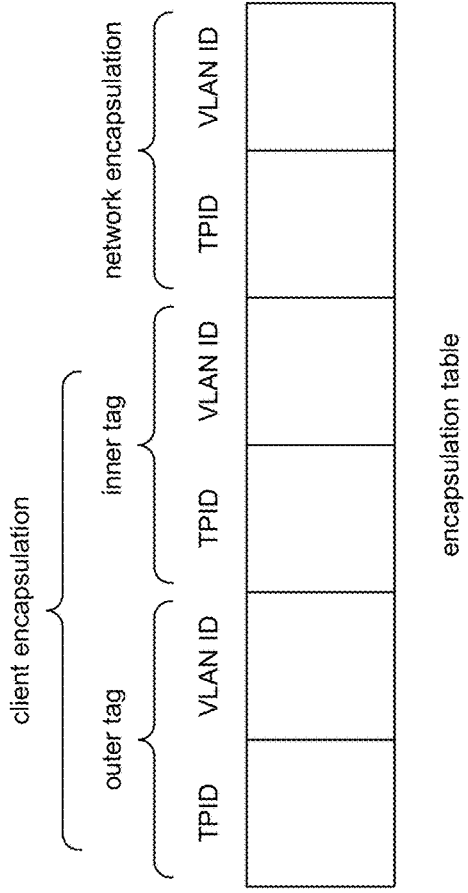

FIG. 5D shows a simplified representation of an encapsulation table to support double-to-single VLAN tag translations. A double-tagged VLAN tag in the ingress packet can be translated to a single-tagged VLAN tag.

Following are examples of encapsulation table entries and a description of how the VLAN tag(s) is translated. For example, consider the following encapsulation table entry:

Client: VLAN 10, Network: VLAN 20

Figure 6:
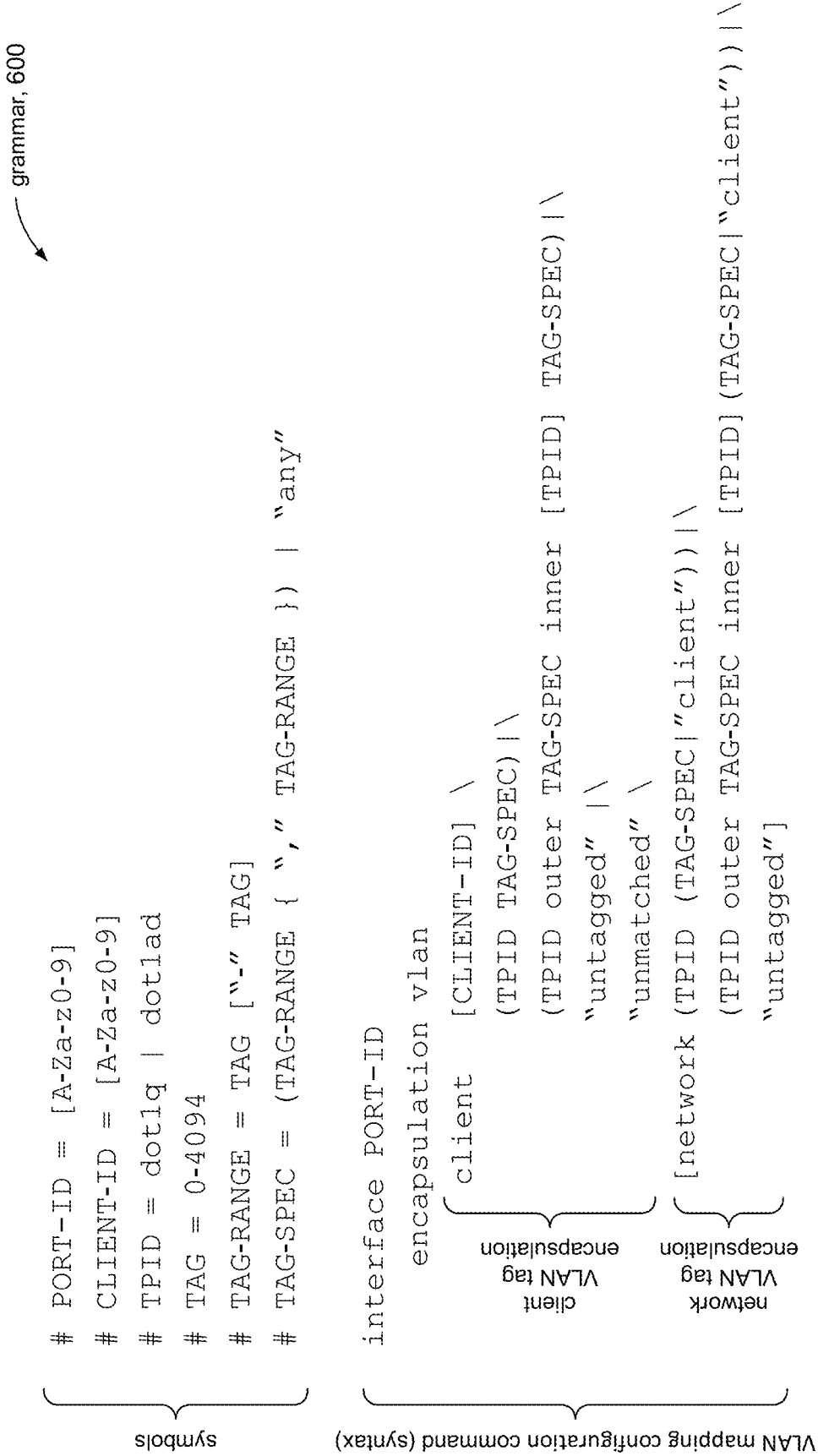
FIG. 6 shows a command syntax for specifying entries in an encapsulation table that includes expressing VLAN tag ranges in accordance with the present disclosure.

This entry specifies a client VLAN tag encapsulation that matches on client-side ingress packets tagged with a VLAN ID 10 and a network encapsulation that matches network-side ingress packets tagged with VLAN ID 20. When a client-side packet is matched, the VLAN ID in the packet is translated (from 10 to 20) prior to being forwarding by the forwarding decision logic. Conversely, when a network-side ingress packet is matched, the VLAN ID in the packet is translated from 20 to 10 prior to being transmitted. Following are additional examples of encapsulation entries and their corresponding behaviors when a client-side ingress packet is matched and when a network-side ingress packet is matched:

ENTRY—CLIENT: OUTER VLAN 10/INNER VLAN 20, NETWORK: OUTER VLAN 20/INNER VLAN 30
  client-side packet—matches on outer VLAN ID 10/inner VLAN ID 20→translate to outer VLAN ID 20/inner VLAN ID 30 prior to forwarding decision
  network-side packet—matches on outer VLAN ID 20/inner VLAN ID 30→translate to outer VLAN ID 10/inner VLAN ID 20 prior to transmit ENTRY—CLIENT: VLAN 10-20, NETWORK: VLAN 30-40
  client-side packet—matches on VLAN ID in the range 10 to 20→translate to VLAN ID to corresponding value in the range 30 to 40 prior to forwarding decision (e.g., 10→30, 11→31, 12→32, etc.) prior to forwarding decision
  network-side packet—matches on VLAN ID in the range 30 to 40→translate to VLAN ID to corresponding value in the range 10 to 20 prior to forwarding decision (e.g., 30→10, 21→11, 22→12, etc.) prior to transmit ENTRY—CLIENT: VLAN 10, NETWORK: CLIENT//"CLIENT" IS A SPECIAL KEYWORD
  client-side packet—matches on VLAN ID 10→effectively, no translation of the VLAN ID is performed prior to forwarding decision; in addition, the PRI and CFI bits from the ingress packet are retained
  network-side packet—matches on VLAN ID 10→effectively, no translation is performed prior to transmit; in addition, the PRI bits from the ingress packet are retained ENTRY—Client: VLAN=10, Network: <unspecified>
  client-side packet—matches on VLAN ID 10→VLAN tag is removed (and not replaced) prior to forwarding decision
  network-side packet—matches all packets→add VLAN tag with VLAN ID 10 prior to transmit FIG. 6 shows a command line interface (CLI) grammar 600 for a VLAN mapping configuration command used to specify and populate the encapsulation table, in accordance with some embodiments. Grammar 600 specifies a VLAN mapping configuration command called interface used to specify one or more entries in an encapsulation table. For example, a user can invoke the configuration command at the CLI of a network device (e.g., CLI 112, FIG. 1A) to define and manage encapsulation tables in the network device.

A symbols portion of grammar 600 identifies user-specified information. For example, the PORT-ID symbol identifies the interface on the network device to which the encapsulation entries are associated. The TPID symbol specifies to match on dot1q VLAN tags or dot1ad VLAN tags. It will be appreciated that in other embodiments, additional VLAN tagging protocols (TPIDs) can be specified. TAG specifies the VLAN ID component in a VLAN tag. TAG-RANGE can specify a specific VLAN ID (e.g., 10) or a range of VLAN IDs (e.g., 10-21). TAG-SPEC specifies one or more comma-separated TAG-RANGEs.

A syntax portion of grammar 600 defines the syntax of the configuration command. The client part of the configuration command specifies a client-side VLAN tag encapsulation (client encapsulation), and a network part specifies the network-side VLAN tag encapsulation (network encapsulation). A VLAN tag encapsulation can be (1) a single-tag format that specifies a TAG-SPEC or (2) a double-tag format that specifies two TAG-SPECs, an outer TAG-SPEC and an inner TAG-SPEC. As can be seen from the syntax in FIG. 6, a configuration command in accordance with the present disclosure can specify single- and double-tagged encapsulations in either or both the client encapsulation and the network encapsulation.

Figure 7:
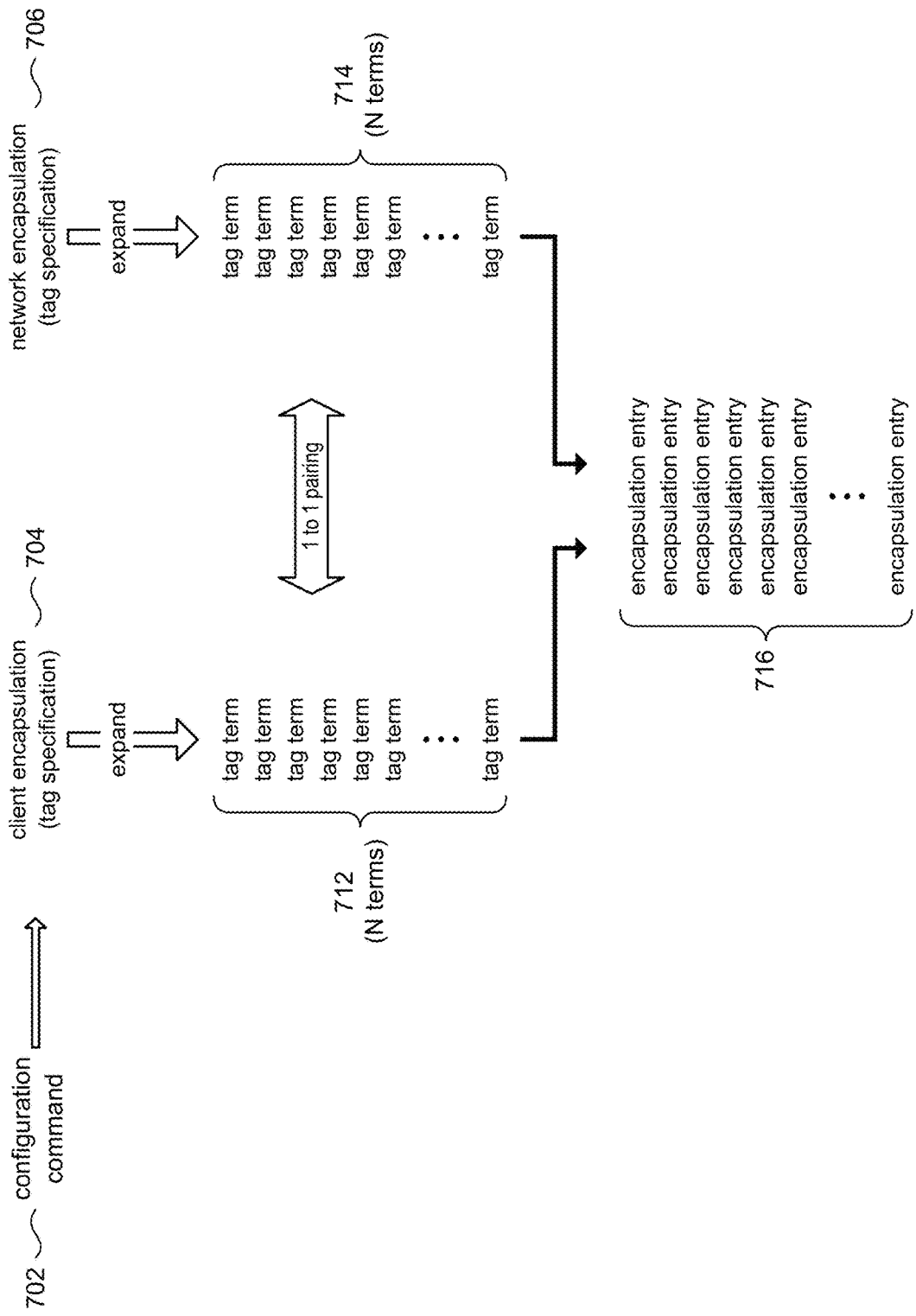
FIG. 7 is a high level block diagram for processing a command in accordance with the present disclosure.

FIG. 7 illustrates the processing of a configuration command to expand the client and network encapsulations in accordance with the present disclosure to produce encapsulation entries. Configuration command 702 specifies client encapsulation 704 and network encapsulation 706. Each of encapsulations 704, 706 are expanded to produce respective sets of tag terms 712, 714. The client-side tag terms 712 are uniquely paired to network-side tag terms 714, where each client-side tag term 714 maps to only one network-side tag term 716 and vice versa. The respective encapsulation entries 716 are generated from the tag term pairings. Following are several examples that illustrate the process:

Single-to-Single Tag Translation

The following configuration command:
interface et1 encapsulation vlan client dot1q 11-20 network dot1q 41-50 represents a mapping between single-tagged client encapsulations and single-tagged network encapsulations. The range specified in the tag specification in the client encapsulation, namely client dot1q 11-20, represents the following ten single-tag formatted tag terms:

---
client dot1q 11
client dot1q 12
client dot1q 13
client dot1q 14
.
.
client dot1q 20
--- and the range specified in the tag specification in the network encapsulation, namely network dot1q 41-50, represents the following ten single-tag formatted tag terms:

---
network dot1q 41
network dot1q 42
network dot1q 43
network dot1q 44
.
.
network dot1q 50
---

A one-to-one pairing between the client tag terms and the network tag terms can be made so that the configuration command expands to or otherwise represents the following ten encapsulation entries to be stored in an encapsulation table that is associated with interface (or port) et1:

---
client dot1q 11 network dot1q 41
client dot1q 12 network dot1q 42
client dot1q 13 network dot1q 43
client dot1q 14 network dot1q 44
:
client dot1q 20 network dot1q 50
---

These encapsulation entries translate ingress packets from the client side that have VLAN tags with VLAN IDs in the range 11-20 to contain VLAN IDs in the range 41-50, respectively, before being forwarded, and vice versa ingress packets from the network side containing VLAN tags with VLAN IDs in the range 41-50 are replaced with respective VLAN IDs in the range 11-20 before being transmitted on interface et1.

Conventionally, a user may be required to enter the following ten separate commands:

---
interface et1 encapsulation vlan client dot1q 11 network dot1q 41
interface et1 encapsulation vlan client dot1q 12 network dot1q 42
interface et1 encapsulation vlan client dot1q 13 network dot1q 43
interface et1 encapsulation vlan client dot1q 14 network dot1q 44
interface et1 encapsulation vlan client dot1q 15 network dot1q 45
interface et1 encapsulation vlan client dot1q 16 network dot1q 46
interface et1 encapsulation vlan client dot1q 17 network dot1q 47
interface et1 encapsulation vlan client dot1q 18 network dot1q 48
interface et1 encapsulation vlan client dot1q 19 network dot1q 49
interface et1 encapsulation vlan client dot1q 20 network dot1q 50
--- to yield the same ten encapsulations that are achieved using the one configuration command shown above.

Double-to-Single Tag Translation

The following configuration command:
interface et10 encapsulation vlan client dot1ad outer 1 inner 1-5 network dot1q 11-15 represents a mapping between double-tagged client encapsulations and single-tagged network encapsulations. The range specified by the tag specification in the client encapsulation, namely client dot1ad outer 1 inner 1-5, represents the following five double-tag formatted tag terms:

---
client dot1ad outer 1 inner 1
client dot1ad outer 1 inner 2
client dot1ad outer 1 inner 3
client dot1ad outer 1 inner 4
client dot1ad outer 1 inner 5
--- and the range specified by the tag specification in the network encapsulation, namely network dot1q 11-15, represents the following ten single-tag formatted tag terms:

---
network dot1q 11
network dot1q 12
network dot1q 13
network dot1q 14
network dot1q 15
---

A one-to-one pairing between the client tag terms and the network tag terms can be made so that the configuration command above expands to or otherwise represents the following five encapsulation entries to be stored in an encapsulation table for interface et10:

```
client dot1ad outer 1 inner 1 network dot1q 11
client dot1ad outer 1 inner 2 network dot1q 12
client dot1ad outer 1 inner 3 network dot1q 13
client dot1ad outer 1 inner 4 network dot1q 14
client dot1ad outer 1 inner 5 network dot1q 15
```

Conventionally, the above five encapsulation entries can require a user to enter the following five separate configuration commands:

```
interface et10 encapsulation vlan client dot1q outer 1 inner 1 network dot1q 11
interface et10 encapsulation vlan client dot1q outer 1 inner 2 network dot1q 12
interface et10 encapsulation vlan client dot1q outer 1 inner 3 network dot1q 13
interface et10 encapsulation vlan client dot1q outer 1 inner 4 network dot1q 14
interface et10 encapsulation vlan client dot1q outer 1 inner 5 network dot1q 15
```

In accordance with the present disclosure, the outer tag specification and/or the inner tag specification can be expressed as ranges. In some embodiments, the outer and inner tag specifications can be expanded as pairs. Consider, for example, the following configuration command:

interface et2 encapsulation vlan client dot1ad outer 1-10 inner 11-20 network dot1q 10-20 where the client encapsulation expresses a range in both the outer VLAN and inner VLAN. The client encapsulation can represent the following double-tag formatted tag terms by pairing each outer VLAN ID with a corresponding inner VLAN ID:

```
client dot1ad outer 1 inner 11
client dot1ad outer 2 inner 12
client dot1ad outer 3 inner 13
:
client dot1ad outer 10 inner 20
```

With paired expansion, the span ratio of the outer tag specification to the inner tag specification can be N:N, N:1, or 1:N. In the above example, for instance, the outer to inner tag specifications have a ratio of N:N, where N is 10. Examples with ratios of N:1 and 1:N are shown below.

In other embodiments, the outer and inner tag specifications can be expanded as a cross product. Consider, for example, the following configuration command:

interface et3 encapsulation vlan client dot1ad outer 1-10 inner 11-20 network dot1q 101-200

The client encapsulation can represent the following 100 double-tag formatted tag terms by taking the cross-product of the outer and inner tag specifications:

```
client dot1ad outer 1 inner 11
client dot1ad outer 1 inner 12
client dot1ad outer 1 inner 13
:
client dot1ad outer 1 inner 20
client dot1ad outer 2 inner 11
client dot1ad outer 2 inner 12
:
client dot1ad outer 2 inner 20
client dot1ad outer 3 inner 11
:
client dot1ad outer 3 inner 20
:
client dot1ad outer 10 inner 11
:
client dot1ad outer 10 inner 20
```

With a cross-product expansion, the span of the outer tag specification can be different from the span of the inner tag specification. For discussion purposes, paired expansion of double-tagged encapsulations (client or network) will be assumed without loss of generality.

Single-to-Double Tag Translation

The following configuration command:
    interface et31 encapsulation vlan client dot1q 11-30 network dot1ad outer 31-50 inner 22
represents a mapping between single-tagged client encapsulations and double-tagged network encapsulations. This configuration command expands to or otherwise represents the following 20 encapsulation entries for interface et31:

```
client dot1q 11 network dot1ad outer 31 inner 22
client dot1q 12 network dot1ad outer 32 inner 22
client dot1q 13 network dot1ad outer 33 inner 22
:
client dot1q 29 network dot1ad outer 49 inner 22
client dot1q 30 network dot1ad outer 50 inner 22
```

The outer and inner tag specifications in the network encapsulation have an outer-to-inner span ratio of N:1, where N=20. The following example:
    interface et31 encapsulation vlan client dot1q 11-20 network dot1ad outer 60 inner 71-80
has an outer-to-inner span ratio of 1:N, where N=10, and expands to:

```
client dot1q 11 network dot1ad outer 60 inner 71
client dot1q 12 network dot1ad outer 60 inner 72
client dot1q 13 network dot1ad outer 60 inner 73
:
client dot1q 20 network dot1ad outer 60 inner 80
```

Double-to-Double. The following configuration command:
    interface et1 encapsulation VLAN client dot1ad outer 11-13 inner 21-23 network dot1ad outer 51-53 inner 40
is an example of a double-to-double tag translation. The outer-to-inner ratio for the client encapsulation is 3:3 and for the network encapsulation is 3:1. Using paired expansion, we obtain the following encapsulation entries for interface et1:

```
client dot1ad outer 11 inner 21 network dot1ad outer 51 inner 40
client dot1ad outer 12 inner 22 network dot1ad outer 52 inner 40
client dot1ad outer 13 inner 23 network dot1ad outer 53 inner 40
```

The following configuration command where the client and network encapsulations both have N:N ratios:

interface et2 encapsulation VLAN client dot1ad outer 101-103 inner 21-23 network dot1ad outer 51-53 inner 41-43 is another example of a double-to-double tag translation. The outer-to-inner ratio for the client encapsulation and the network encapsulation is 3:3. Using paired expansion, we obtain the following encapsulation entries for interface et2:

```
client dot1ad outer 101 inner 21 network dot1ad outer 51 inner 41
client dot1ad outer 102 inner 22 network dot1ad outer 52 inner 42
client dot1ad outer 103 inner 23 network dot1ad outer 53 inner 43
```

Special Cases

In accordance with some embodiments, special processing can be specified. In some embodiments, for example, the network encapsulation can specify a keyword (e.g., CLIENT) to indicate that the client encapsulation in an ingress packet is not translated and that the priority bits PRI be preserved as the ingress packet. For example, the following configuration command examples:

interface et1 encapsulation VLAN client dot1q 11 network client interface et2 encapsulation VLAN client dot1q 21 network dot1ad outer 100 inner CLIENT will preserve both the client encapsulation and the priority bits when a packet ingresses from the client side or from the network side. The first example shows a single-to-single translation in which the client encapsulation is not translated. The second example shows a single-to-double translation in which an outer encapsulation is added to the client encapsulation.

In some embodiments, a VLAN ID of '0' (zero) can mean that the VLAN ID is not included, but we preserve the priority bits; for example:

interface et2 encapsulation VLAN client 0 network CLIENT

One can immediately appreciate from the examples above, that configuration commands in accordance with the present disclosure provide compactness and efficiency in the ability to specify a large number of encapsulation entries using only a single configuration command with tag ranges. This can be especially significant when, in a large deployment, the tag range may specify many tens to hundreds of entries. Allowing a user to specify a range of encapsulations in accordance with the present disclosure is much less error prone.

Figure 8:
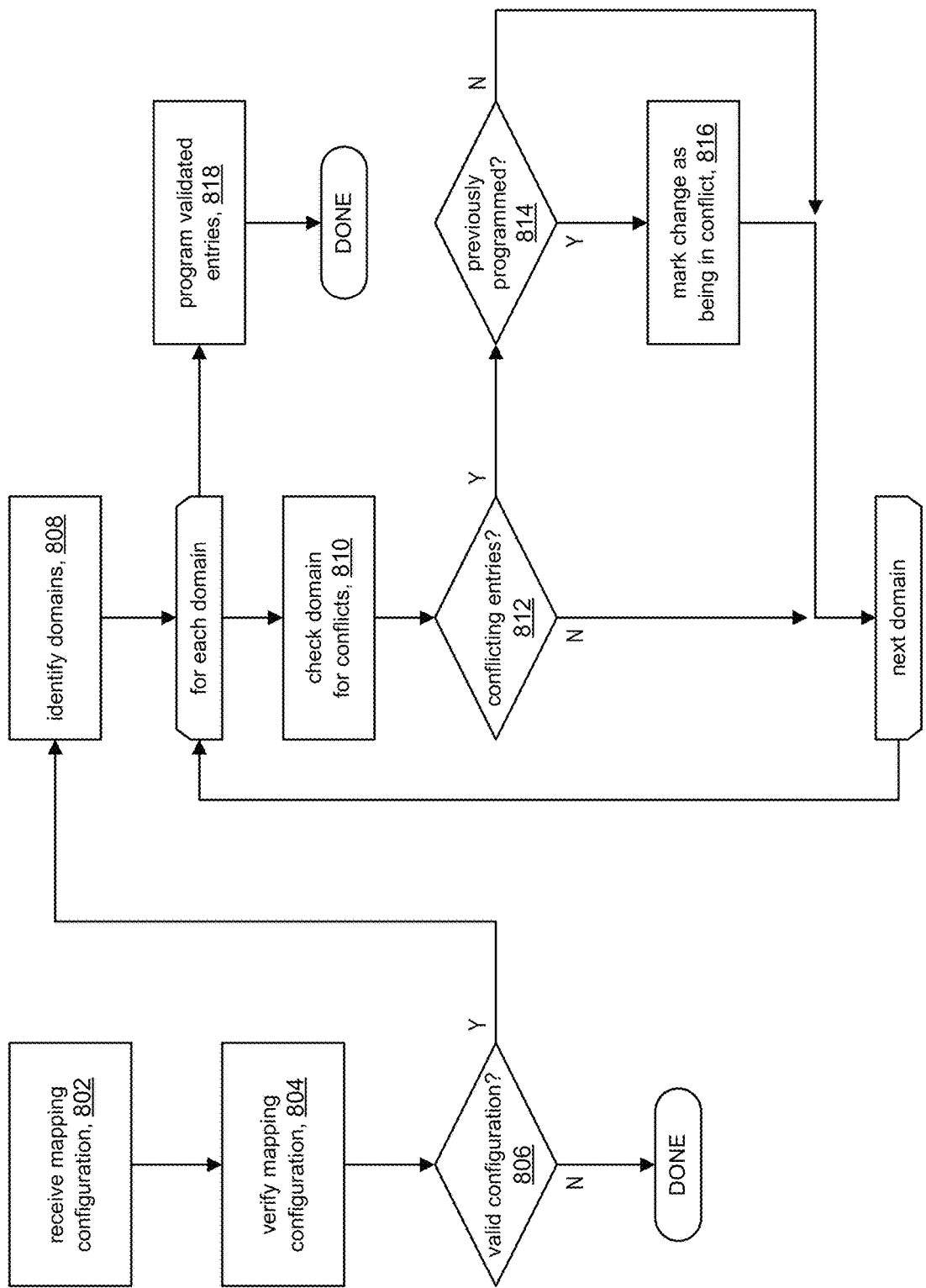
FIG. 8 shows operations for processing a command in accordance with the present disclosure.

Referring to FIG. 8 and other figures, the discussion will now turn to a high level description of operations and processing in a network device to specify VLAN tag mapping in accordance with the present disclosure. In some embodiments, for example, the network device can include computer executable program code, which when executed by one or more processors (e.g., 908, FIG. 9) comprising the network device, can cause the processors to perform processing in accordance with FIG. 8. The operation and processing blocks described below are not necessarily executed in the order shown, and can be allocated for execution among one or more concurrently executing processes and/or threads.

At operation 802, the network device can receive a VLAN tag mapping configuration. In some embodiments, for example, the network device can include a CLI (e.g., 112, FIG. 1A) to allow a user to specify a VLAN tag mapping configuration via a suitable command, for example, such as the interface command shown in FIG. 6.

At operation 804, the network device can verify the user-specified configuration. In some embodiments, for example, a valid configuration exists when there is a unique and bi-directional (unambiguous) mapping between each client-side encapsulation and network-side encapsulation. Following are representative considerations for what is deemed a proper specification. The following client/network encapsulation specifications:

Ex. 1 . . . client 10 network 21 . . .
Ex. 2 . . . client outer 1 inner 10 network 21 . . .
Ex. 3 . . . client 1-10 network 21-30 . . .
Ex. 4 . . . client outer 1 inner 11-20 network 101-110 . . .

can be deemed to be proper. In Example 1, it is clear there is a unique bi-directional mapping between the client encapsulation (VLAN ID 10) and the network VLAN ID 21. Likewise in Example 2, the client encapsulation (outer 1 inner 10) uniquely and bi-directionally maps to network VLAN ID 21. Assuming without loss of generality that ranges expand as pairs, in Example 3, the client encapsulation expands to the tag terms (VLAN ID 1, 2, . . . ) and the network encapsulation expands to the tag terms (VLAN ID 21, 21, . . . ). Each of the client-side tag terms maps one to one to a respective network-side tag term and so the mapping is unique and bi-directional. Likewise in Example 4, the client encapsulation expands to the double-tag formatted tag terms (outer 1 inner 11, outer 1 inner 12, . . . ) and the network encapsulation expands to the single-tag formatted tag terms (101, 102, . . . ), again assuming without loss of generality that ranges expand as pairs. Each client tag term maps uniquely and bi-directionally to a respective network tag term.

By contrast, the following encapsulation specifications:

Ex. 1 . . . client dot1q 1-10 network dot1q 21 . . .
Ex. 2 . . . clientdot1ad outer 1 inner 11-30 network dot1ad outer 101-110 inner 110 . . .

are deemed improper. In Example 1, mapping in the client-to-network direction can be deemed unique; however, mapping in the network-to-client direction is not unique; e.g., when a packet from the network contains single-tag VLAN ID 21, the network device cannot unambiguously determine which client-side encapsulation to apply; the network-to-client mapping is non-deterministic. Example 2 exhibits the same non-deterministic behavior. Generally, it can be seen that when the client-side encapsulation expands to a different number of tag terms than on the network-side encapsulation, then the mapping is not unique and bidirectional.

Another factor that can be considered to assess the validity of the user-specified configuration is that there be no internal conflicts among the specified configurations. Consider the following sequence of configuration commands, for example:

1$^{st}$ configuration: interface et1.1 encapsulation vlan client dot1q outer 2 inner 1-10 network 100

2$^{nd}$ configuration: interface et1.1 encapsulation vlan client dot1q outer 1-5 inner 6-9 network 200

The second configuration would be deemed invalid because the set of tag terms represented by the client encapsulation overlaps with the set tag terms specified by the client encapsulation in the first configuration. More specifically, the first configuration specifies the following tag

```
outer 2 inner 6
outer 2 inner 7
outer 2 inner 8
```

The second configuration specifies the tag term (using paired expansion):
    outer 2 inner 7
which overlaps with the first configuration.

Validity of the user-specified configuration can be further assessed based on whether the command can result in traffic loss. Consider, for example, the following sequence of configuration commands:

```
interface et1.1 encapsulation vlan client dot1ad outer 1 inner 1-10 network dot1q 100
interface et1.2 encapsulation vlan client dot1q 1 network dot1q 200
```

Although they both specify VLAN ID 1, et1.1 uniquely matches because it is more specific (outer 1/inner 1, outer 1/inner 2, . . . outer 1/inner 10) vs. et1.2 which only matches tag 1, and so traffic will not be affected.

However, the following sequence of configuration commands will affect traffic:
  1st configuration: interface et1.1 encapsulation vlan client dot1ad outer 1 inner 1-10 network dot1q 100
  2nd configuration: interface et1.2 encapsulation vlan client dot1ad outer 1 inner 10 network dot1q 200

Configuring the et1.2 interface conflicts with an existing VLAN tag configuration on et1.1, namely "outer 1, inner 10". Accordingly, the second configuration command would be flagged for error.

At decision point 806, if the user-specified configuration is valid, the network device can continue with processing at operation 808. Otherwise, the network device can reject the configuration; e.g., the CLI can flag an error message to the user and otherwise not process the user-specified configuration; processing the user-specified configuration can be deemed complete.

At operation 808, the network device can identify domains specified in the user-specified configuration. As noted above, a set of VLANs defined among a group of network devices may collectively constitute a network domain. "Domain" as used in the context of a user-specified VLAN tag mapping configuration has a second meaning. On the client-facing side of a network device, a domain can be classified by physical property; for example, Ethernet1.1, Ethernet 1.2 are part of Ethernet 1 (the same physical port). On the network-facing side, a domain can be classified by forwarding feature. For example, a Border Gateway Protocol (BGP) Virtual Private Wire Service (VPWS) pseudowire patch defined with Ethernet1.1, Ethernet2.1, Ethernet3.1 as local connectors can constitute a domain; the local connectors are part of the same domain (patch). Encapsulated protocols with different TPIDs belong to different domains. The network device can process each identified domain in accordance with the following operations.

At operation 810, the network device can check the domain for any conflicts. We can check for domain conflicts in the outer/inner VLAN configurations. For example, the client-side encapsulation specifications set forth in the following two configuration commands:
  First Command: . . . client dot1ad 1 . . .
  Second Command: . . . client dot1ad outer 1 inner 10 . . .
do not specify conflicting domains because the second command must match a double tagged packet of outer 1 inner 10, whereas the first command only matches against the outer tag 1. So an incoming packet of 1 or outer 1/inner 9 will match against the first command, but outer 1/inner 10 will match against the second command, thus the two commands are not conflicting. Likewise, the client-side tag encapsulation specifications in the following two commands:
  First Command: . . . client dot1ad outer 1-10 inner 11-20 . . .
  Second Command: . . . client dot1ad outer 1 inner 12 . . .
also do not conflict because the encapsulation specified in the second command (i.e., outer 1 inner 12) is not covered by the encapsulation range specified in the first command. Recall that for discussion purposes, we use paired expansion to expand ranges involving outer and inner encapsulations.

On the other hand, the client-side tag encapsulations in the following two configurations:
  First Command: . . . client dot1ad outer 1 inner 10 . . .
  Second Command: . . . client dot1ad outer 1-10 inner 10 . . .
are in conflict. The encapsulation range specified in the second command includes outer 1, inner 10, which was already specified in the first command and hence is in conflict. Accordingly, the second command would be rejected.

We can also check for domain conflicts in the TPIDs. For example, the client-side tag configurations in the following two commands:
  First Command: . . . client dot1q outer 1-10 dot1ad inner 10 . . .
  Second Command: . . . client dot1ad outer 1 dot1ad inner 10 . . .
do not specify conflicting domains. Although the second command specifies outer and inner VLAN IDs that are covered by the first command, namely outer 10, inner 1, the second command specifies an outer VLAN ID in a domain (i.e., dot1ad) different than the domain specified in the first command (i.e., dot1q). Accordingly, the second command would be accepted. On the other hand, the client-side tag configurations in the following commands conflict with each other:
  First Command: . . . client dot1q outer 10 dot1ad inner 10 . . .
  Second Command: . . . client dot1q outer 1-10 dot1ad inner 1-10 . . .
because the encapsulation specified in the first command is covered by the encapsulation range, in both VLAN IDs and TPIDs, specified in the second command. Accordingly, the second command would be rejected.

It is noted that while the foregoing examples use client-side configurations, it will be appreciated that the discussion applies for network-side configurations.

At decision point 812, if any entries are in conflict, the network device can continue to decision point 816 to process the conflicting entries. Any non-conflicting entries at this point can be deemed to be validated entries. The network device can continue processing with the next identified domain.

At decision point 814, if a conflicting entry has been previously programmed in the forwarding hardware of the network device, then the network device can mark the incremental change on the existing entry as being in conflict (operation 816). The network device can continue processing with the next identified domain.

Figure 9:
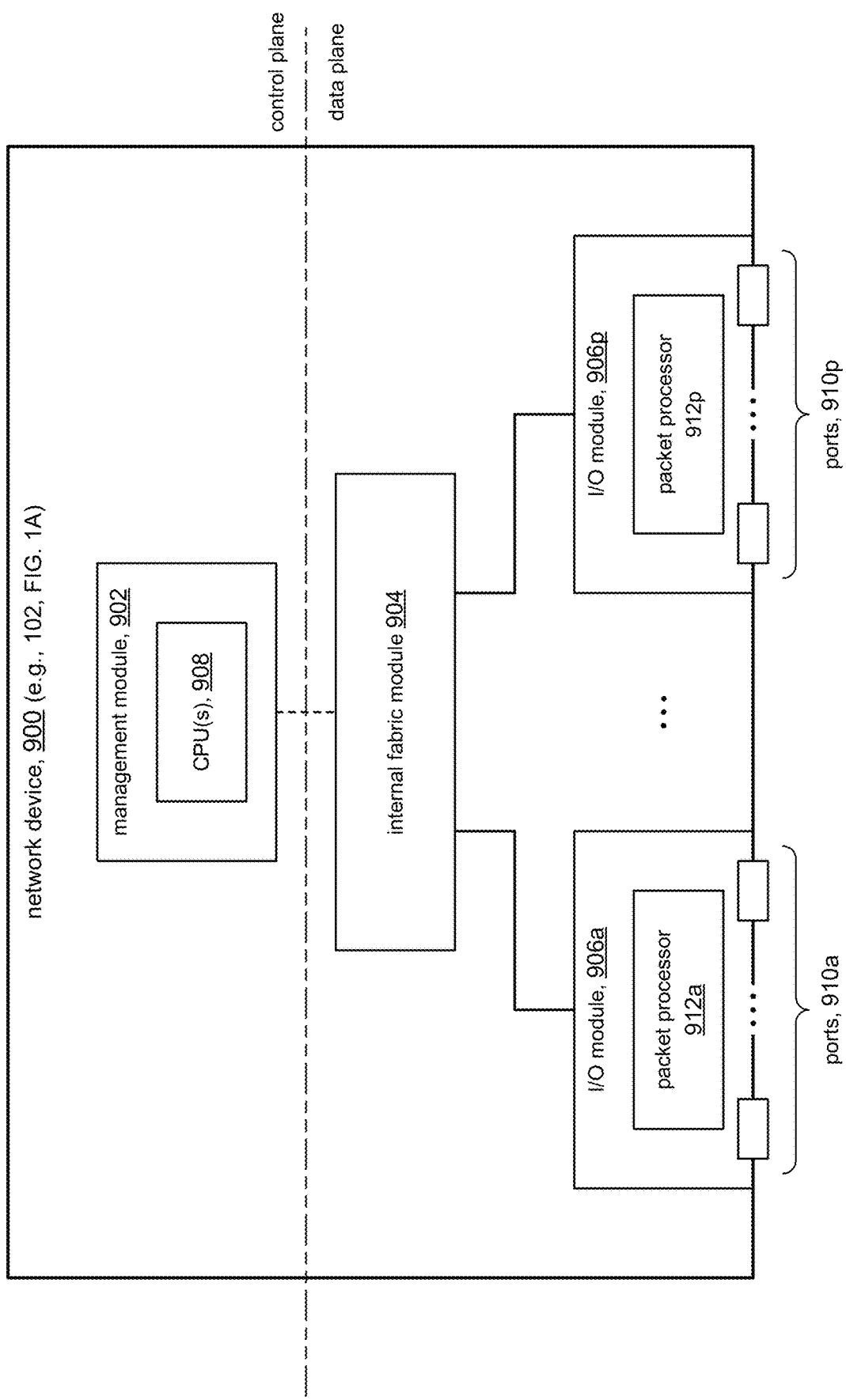
FIG. 9 shows an illustrative network device in accordance with some embodiments.

At operation 818, after each domain has been checked for conflicts, the network device can program any validated entries specified by the user-specified configuration into the forwarding hardware (e.g., encapsulation table, 108) of the network device. Processing of the user-specified configuration can be deemed completed FIG. 9 depicts an example of a network device 900 (e.g., 102a, FIG. 1) in accordance with some embodiments of the present disclosure. As shown, network device 900 includes a management module 902, an internal fabric module 904, and a number of I/O modules 906a-906p. Management module 902 includes the control plane (also referred to as control layer) of network device 900 and can include one or more management CPUs 908 for managing and controlling operation of network device 900 in accordance with the present disclosure. For example, management module 902 can provide CLI (e.g., 112) functionality in accordance with the present disclosure Each management CPU 908 can be a general purpose processor, such as but not limited to an Intel®/AMD® x86 or ARM® processor, that operates under the control of executable program code executed from memory (not shown), such as dynamic random access memory (DRAM). The executable program code can be non-transitory executable program code stored in non-volatile storage medium (e.g., static RAM, not shown). The control plane refers to functions and processes that determine which path to use, such as routing protocols, spanning tree, and the like.

Internal fabric module 904 and I/O modules 906a-906p collectively represent the data plane of network device 900 (also referred to as data layer, forwarding plane, etc.). Internal fabric module 904 is configured to interconnect the various other modules of network device 900. Each I/O module 906a-906p includes one or more input/output ports 910a-910p that are used by network device 900 to send and receive network packets. Each I/O module 906a-906p can also include a packet processor 912a-912p. Each packet processor 912a-912p can comprise a forwarding hardware component (e.g., application specific integrated circuit (ASIC), field programmable array (FPGA), digital processing unit, graphics coprocessors, content-addressable memory, and the like) configured to make wire speed decisions on how to handle incoming (ingress) and outgoing (egress) network packets. In accordance with some embodiments some aspects of the present disclosure can be performed wholly within the data plane.

Further Examples

In accordance with embodiments of the present disclosure, a method in a network device includes: receiving a virtual local area network (VLAN) mapping configuration command comprising a first encapsulation that represents a plurality of first tag terms and a second encapsulation that represents a plurality of second tag terms; associating the plurality of first tag terms to corresponding tag terms among the plurality of second tag terms, wherein each first tag term associates with exactly one second tag term; storing into a memory of the network device a plurality of encapsulation entries, each encapsulation entry representing an association between one of the first tag terms and one of the second tag terms; using the plurality of encapsulation entries to identify a packet transiting the network device, the identified packet having a tag string that matches one of the first tag terms; and in response to identifying a packet, rewriting the identified packet using the second tag term that corresponds to the one of the first tag terms, wherein the rewritten packet continues transiting the network device.

In some embodiments, a tag term can be a single VLAN tag or a double VLAN tag comprising an outer VLAN tag and an inner VLAN tag.

In some embodiments, the first encapsulation expresses the plurality of first tag terms without enumerating the plurality of first tag terms, wherein the second encapsulation expresses the plurality of second tag terms without enumerating the plurality of second tag terms.

In some embodiments, the first encapsulation and the second encapsulation specify their respective plurality of tag terms as a range of tag terms.

In some embodiments, rewriting the identified packet includes retaining the tag string of the identified packet.

In some embodiments, rewriting the identified packet includes removing a VLAN identifier from the tag string in the identified packet.

In accordance with embodiments of the present disclosure, a network device includes one or more computer processors and a computer-readable storage medium. The computer-readable storage medium comprises instructions for controlling the one or more computer processors to: receive a configuration command comprising a first VLAN encapsulation and a second VLAN encapsulation; expand the first VLAN encapsulation to produce a plurality of first tag terms; expand the second VLAN encapsulation to produce a plurality of second tag terms; and map each of the first tag terms to one of the second tag terms to produce a plurality of encapsulation entries. One or more VLAN tags in a packet transiting the network device are translated according to an encapsulation entry that is matched by the packet.

In some embodiments, the first VLAN encapsulation and the second VLAN encapsulation specify their respective plurality of tag terms as ranges of tag terms.

In some embodiments, the computer-readable storage medium further comprises instructions for controlling the one or more computer processors to reject the configuration command when the plurality of first tag terms is not the same in number as the plurality of second tag terms.

In some embodiments, the computer-readable storage medium further comprises instructions for controlling the one or more computer processors to reject the configuration command when either the plurality of first tag terms or the plurality of second tag terms produces a previously stored encapsulation entry produced from a previous configuration command.

In some embodiments, the computer-readable storage medium further comprises instructions for controlling the one or more computer processors to reject the configuration command when a domain represented by the configuration command conflicts with a domain represented by a previous configuration command.

In some embodiments, the computer-readable storage medium further comprises instructions for controlling the one or more computer processors to reject the configuration command when the configuration command and a previous configuration command represent a same tag term.

In some embodiments, each first tag term uniquely maps to one second tag term and each second tag term uniquely maps to one first tag term.

In some embodiments, the plurality of first tag terms are used to match packets ingressing from a client-side of the network device, wherein the plurality of second tag terms are used to match packets ingressing from a network-side of the network device.

In accordance with embodiments of the present disclosure, a method in a network device includes: receiving a configuration command comprising a first encapsulation and a second encapsulation; generating a plurality of first tag terms from the first encapsulation; generating a plurality of second tag terms from the second encapsulation; generating encapsulation entries by associating each first tag term to a second tag term; matching a packet transiting the network device with one of the encapsulation entries; and translating a VLAN tag contained in the matched packet using the first and second tag terms comprising the one of the encapsulation entries that matches the packet.

In some embodiments, a tag term can be a single VLAN tag or a double VLAN tag comprising an outer VLAN tag and an inner VLAN tag.

In some embodiments, the plurality of first tag terms map in one-to-one correspondence to the plurality of second tag terms.

In some embodiments, the method further includes translating the tag in the packet followed by forwarding the translated packet to a port of the network device when the packet ingresses from a client-side of the network device.

In some embodiments, the configuration command is rejected when the configuration command does not produce a unique and bi-directional mapping between each first tag term and each second tag term.

In some embodiments, translating a VLAN tag contained in the matched packet includes removing a VLAN identifier from the VLAN tag.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a network device, the method comprising:
   receiving, by the network device, a range of client-side tags and a range of network-side tags by way of a virtual local area network (VLAN) mapping configuration command;
   pairing, by the network device, client-side tags in the range of client-side tags with respective network-side tags in the range of network-side tags;
   generating, by the network device a plurality of encapsulation entries, each encapsulation entry comprising a pairing between one of the client-side tags and one of the network-side tags; and;
   storing into a memory of the network device the plurality of encapsulation entries,
   wherein an ingress packet is translated by the network device to a tag-translated packet according to an encapsulation entry identified among the plurality of encapsulation entries, wherein the encapsulation entry is identified by matching a tag in the ingress packet to the client-side tag in the identified encapsulation entry.

2. The method of claim 1, wherein each of the range of client-side tags and the range of network-side tags can be a single VLAN tag or a double VLAN tag comprising an outer VLAN tag and an inner VLAN tag.

3. The method of claim 1, wherein the range of client-side tags expresses a plurality of first tag terms without enumerating the plurality of first tag terms, wherein the range of network-side tags expresses a plurality of second tag terms without enumerating the plurality of second tag terms.

4. A network device comprising:
   one or more computer processors; and
   a computer-readable storage medium comprising instructions for controlling the one or more computer processors to:
      receive user input comprising a configuration command that specifies a range of client-side tags and a range of network-side tags;
      pair client-side tags in the range of client-side tags with respective network-side tags in the range of network-side tags; and
      generate a plurality of encapsulation entries, each encapsulation entry comprising a pairing between one of the client-side tags and one of the network-side tags,
      wherein a tag-translated packet is generated by translating an ingress packet according to an encapsulation entry identified among the plurality of encapsulation entries, wherein the encapsulation entry is identified by matching a tag in the ingress packet to the client-side tag in the identified encapsulation entry.

5. The network device of claim 4, wherein the computer-readable storage medium further comprises instructions for controlling the one or more computer processors to reject the configuration command when the range of client-side tags is not the same in number as the range of network-side tags.

6. The network device of claim 4, wherein the computer-readable storage medium further comprises instructions for controlling the one or more computer processors to reject the configuration command when the generated plurality of encapsulation entries includes an encapsulation entry produced from a previous configuration command.

7. The network device of claim 4, wherein the computer-readable storage medium further comprises instructions for controlling the one or more computer processors to reject the configuration command when a domain represented by the configuration command conflicts with a domain represented by a previous configuration command.

8. The network device of claim 4, wherein the computer-readable storage medium further comprises instructions for controlling the one or more computer processors to reject the configuration command when the configuration command and a previous configuration command represent a same tag term.

9. The network device of claim 4, wherein each client-side tag uniquely maps to one of the network-side tags.

10. The network device of claim 4, wherein the range of client-side tags are used to match packets ingressing from a client-side of the network device, wherein the range of network-side tags are used to match packets ingressing from a network-side of the network device.

11. A method in a network device, the method comprising:
   receiving a configuration command from a user, wherein the command specifies a range of client-side tags and a range of network-side tags;
   generating a plurality of first tag terms from the range of client-side tags;
   generating a plurality of second tag terms from the range of network-side tags;
   generating encapsulation entries that represent pairings between the first tag terms and the second tag terms;
   matching a packet transiting the network device with one of the encapsulation entries; and translating a VLAN tag contained in the matched packet using the first and second tag terms comprising the one of the encapsulation entries that matches the packet.

12. The method of claim 11, wherein a tag term can be a single VLAN tag or a double VLAN tag comprising an outer VLAN tag and an inner VLAN tag.

13. The method of claim 11, wherein the plurality of first tag terms map in one-to-one correspondence to the plurality of second tag terms.

14. The method of claim 11, further comprising translating the tag in the packet followed by forwarding the translated packet to a port of the network device when the packet ingresses from a client-side of the network device.

15. The method of claim 11, wherein the configuration command is rejected when the configuration command does not produce a unique and bi-directional mapping between each first tag term and each second tag term.

16. The method of claim 11, wherein translating a VLAN tag contained in the matched packet includes removing a VLAN identifier from the VLAN tag.

* * * * *